US012669767B2

(12) United States Patent
Ishida

(10) Patent No.: US 12,669,767 B2
(45) Date of Patent: Jun. 30, 2026

(54) IMAGE FORMING APPARATUS CAPABLE OF SUPPRESSING MALFUNCTION OF SENSOR AND CONVEYANCE CONTROL METHOD

(71) Applicant: KYOCERA Document Solutions Inc., Osaka (JP)

(72) Inventor: Keiju Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 20 days.

(21) Appl. No.: 18/672,369

(22) Filed: May 23, 2024

(65) Prior Publication Data

US 2024/0393720 A1 Nov. 28, 2024

(30) Foreign Application Priority Data

May 26, 2023 (JP) ................................ 2023-086792

(51) Int. Cl.
*G03G 15/23* (2006.01)
*G03G 15/00* (2006.01)
*G03G 21/20* (2006.01)

(52) U.S. Cl.
CPC ....... *G03G 15/231* (2013.01); *G03G 15/6552* (2013.01); *G03G 15/6573* (2013.01); *G03G 21/206* (2013.01); *G03G 2215/00611* (2013.01)

(58) Field of Classification Search
CPC .................. G03G 21/206; G03G 2215/00611
See application file for complete search history.

(56) References Cited

U.S. PATENT DOCUMENTS

| | | | | |
|---|---|---|---|---|
| 8,509,646 | B2 * | 8/2013 | Shimizu | G03G 21/206 399/92 |
| 9,342,024 | B2 * | 5/2016 | Maeda | G03G 15/6576 |
| 10,301,130 | B2 * | 5/2019 | Suzuki | B65H 7/14 |
| 10,866,555 | B2 * | 12/2020 | Okuma | G03G 15/55 |
| 2007/0019981 | A1 * | 1/2007 | Kawamata | G03G 15/6573 399/92 |
| 2013/0243471 | A1 * | 9/2013 | Ikeda | G03G 21/206 399/93 |

FOREIGN PATENT DOCUMENTS

JP 2007033520 A 2/2007

* cited by examiner

*Primary Examiner* — Patrick Cicchino
(74) *Attorney, Agent, or Firm* — Alleman Hall LLP

(57) ABSTRACT

An image forming apparatus includes a transfer portion, a fixing portion, a sensor, a duct, and an airflow generation portion. The transfer portion transfers a toner image to a sheet. The fixing portion fixes the toner image transferred to the sheet by the transfer portion on the sheet. The sensor senses the sheet on a downstream side of the transfer portion in a conveyance direction of the sheet and an upstream side of the fixing portion in the conveyance direction. The duct extends from an air intake port to an air blowing port. The air intake port is open on an upper surface of the image forming apparatus. The air blowing port is open toward the sensor. The airflow generation portion generates airflow that moves in the duct from the air intake port to the air blowing port.

4 Claims, 5 Drawing Sheets

IMAGE FORMING APPARATUS CAPABLE OF SUPPRESSING MALFUNCTION OF SENSOR AND CONVEYANCE CONTROL METHOD

INCORPORATION BY REFERENCE

This application is based upon and claims the benefit of priority from the corresponding Japanese Patent Application No. 2023-086792 filed on May 26, 2023, the entire contents of which are incorporated herein by reference.

BACKGROUND

This disclosure relates to an image forming apparatus and a conveyance control method.

A known image forming apparatus includes a transfer portion, a fixing portion, and a sensor. The transfer portion transfers a toner image to a sheet. The fixing portion fixes the toner image transferred to the sheet by the transfer portion on the sheet. The sensor senses the sheet on a downstream side of the transfer portion in a conveyance direction of the sheet and an upstream side of the fixing portion in the conveyance direction.

In the image forming apparatus, heat generated in the fixing portion sometimes causes the sensor to malfunction. To address this, the image forming apparatus that blows air to the sensor to cool the sensor has been known as related art.

SUMMARY

The image forming apparatus according to this disclosure includes a transfer portion, a fixing portion, a sensor, a duct, and an airflow generation portion. The transfer portion transfers a toner image to a sheet. The fixing portion fixes the toner image transferred to the sheet by the transfer portion on the sheet. The sensor senses the sheet on a downstream side of the transfer portion in a conveyance direction of the sheet and an upstream side of the fixing portion in the conveyance direction. The duct extends from an air intake port to an air blowing port. The air intake port is open on an upper surface of the image forming apparatus. The air blowing port is open toward the sensor. The airflow generation portion generates airflow that moves in the duct from the air intake port to the air blowing port.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described in detail with reference to the appended drawings. It is to be noted that the following embodiment is a specific example of this disclosure and does not limit the technical scope of this disclosure.

[Configuration of Image Forming Apparatus 100]

Figure 1:
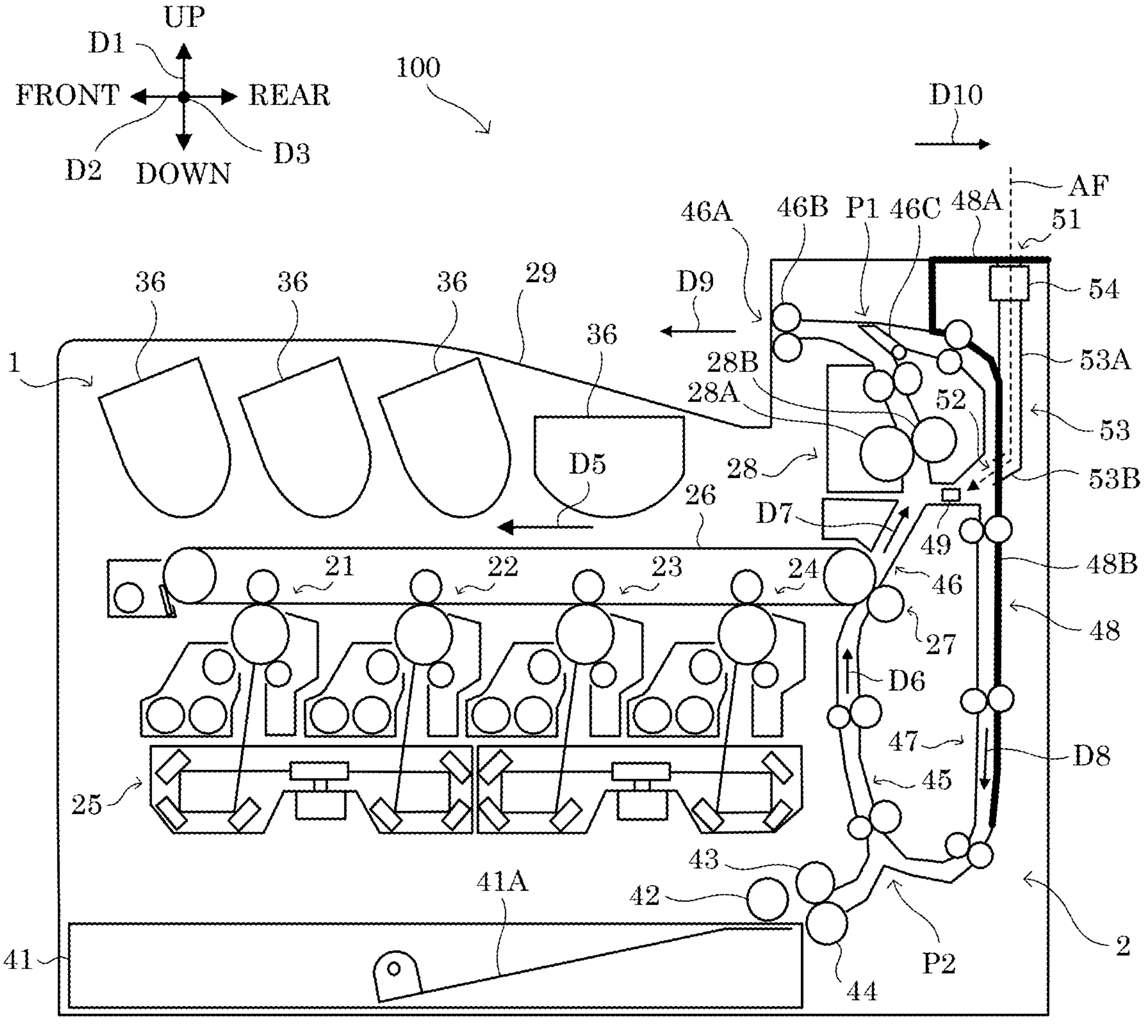
FIG. 1 is a cross-sectional view of a configuration of an image forming apparatus according to an embodiment of this disclosure.

First, a configuration of an image forming apparatus 100 according to an embodiment of this disclosure will be described with reference to FIGS. 1 and 2. It is to be noted that FIG. 1 shows a guide member 48 with a thick line. In addition, FIG. 1 shows airflow AF with a dashed arrow.

For convenience of description, a perpendicular direction is defined as an up-down direction D1 with the image forming apparatus 100 in a usable installation state (state shown in FIG. 1). In addition, a front-rear direction D2 is defined by using a surface of the image forming apparatus 100 shown in FIG. 1 corresponding to the left of FIG. 1 as a front (front surface). Furthermore, a left-right direction D3 is defined on the basis of the front of the image forming apparatus 100 in the installation state.

The image forming apparatus 100 is a printer having a printing function of forming an image based on image data on a sheet by electrophotography. It is to be noted that the image forming apparatus according to this disclosure is not limited to a printer. It is sufficient if the image forming apparatus according to this disclosure is any apparatus having the printing function.

Figure 2:
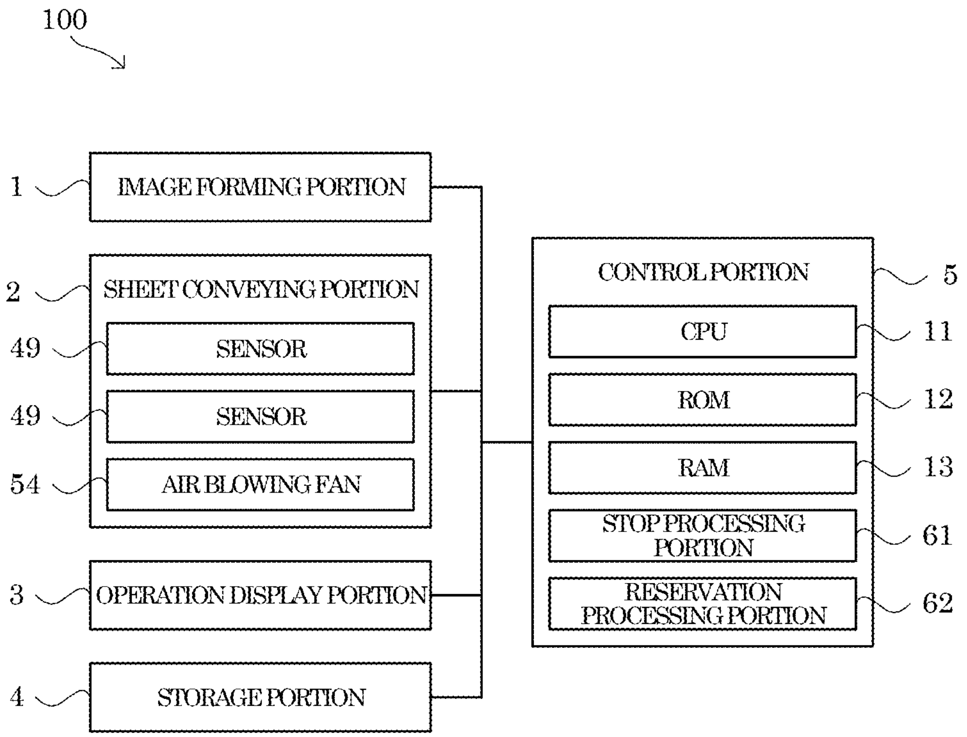
FIG. 2 is a block diagram showing a system configuration of the image forming apparatus according to the embodiment of this disclosure.

As shown in FIGS. 1 and 2, the image forming apparatus 100 includes an image forming portion 1, a sheet conveying portion 2, an operation display portion 3, a storage portion 4, and a control portion 5.

The image forming portion 1 achieves the printing function. Specifically, the image forming portion 1 forms a color or monochrome image on a sheet supplied from the sheet conveying portion 2 in accordance with electrophotography.

The sheet conveying portion 2 conveys a sheet on which the image forming portion 1 forms an image.

The operation display portion 3 is a user interface of the image forming apparatus 100. The operation display portion 3 includes a display portion and an operation portion. The display portion displays various kinds of information in response to a control instruction from the control portion 5. For example, the display portion is a liquid-crystal display. The operation portion inputs various kinds of information to the control portion 5 in response to an operation of a user. For example, the operation portion is a touch panel.

The storage portion 4 is a nonvolatile storage device. For example, the storage portion 4 is a flash memory. It is to be noted that the storage portion 4 may be a solid state drive (SSD) or a hard disk drive (HDD).

The control portion 5 integrally controls the image forming apparatus 100. It is to be noted that the control portion 5 may be a control portion provided separately from a main control portion which integrally controls the image forming apparatus 100.

As shown in FIG. 2, the control portion 5 includes a CPU 11, a ROM 12, and a RAM 13. The CPU 11 is a processor that executes various calculation processes. The ROM 12 is a nonvolatile storage device in which information is stored in advance for a control program or the like for causing the CPU 11 to execute various processes. The RAM 13 is a volatile or nonvolatile storage device that is used as a temporary storage memory (work area) for various processes which are executed by the CPU 11. The CPU 11 integrally controls the image forming apparatus 100 by executing various control programs stored in the ROM 12 in advance. It is to be noted that the control portion 5 may include an electronic circuit such as an integrated circuit (ASIC).

[Configuration of Image Forming Portion 1]

Next, a configuration of the image forming portion 1 will be described with reference to FIGS. 1 to 3. Here, FIG. 3 is a cross-sectional view of a configuration of an image forming unit 24.

As shown in FIG. 1, the image forming portion 1 includes a plurality of image forming units 21 to 24, a laser scanning unit 25, an intermediate transfer belt 26, a secondary transfer roller 27, a fixing device 28, and a sheet discharge tray 29.

The image forming unit 21 forms a toner image on the intermediate transfer belt 26 by using a toner of Y (yellow). The image forming unit 22 forms a toner image on the intermediate transfer belt 26 by using a toner of C (cyan). The image forming unit 23 forms a toner image on the intermediate transfer belt 26 by using a toner of M (magenta). The image forming unit 24 forms a toner image on the intermediate transfer belt 26 by using a toner of K (black). As shown in FIG. 1, the image forming units 21 to 24 are provided side by side along the front-rear direction D2 of the image forming apparatus 100 in order of yellow, cyan, magenta, and black from the front of the image forming apparatus 100.

Figure 3:
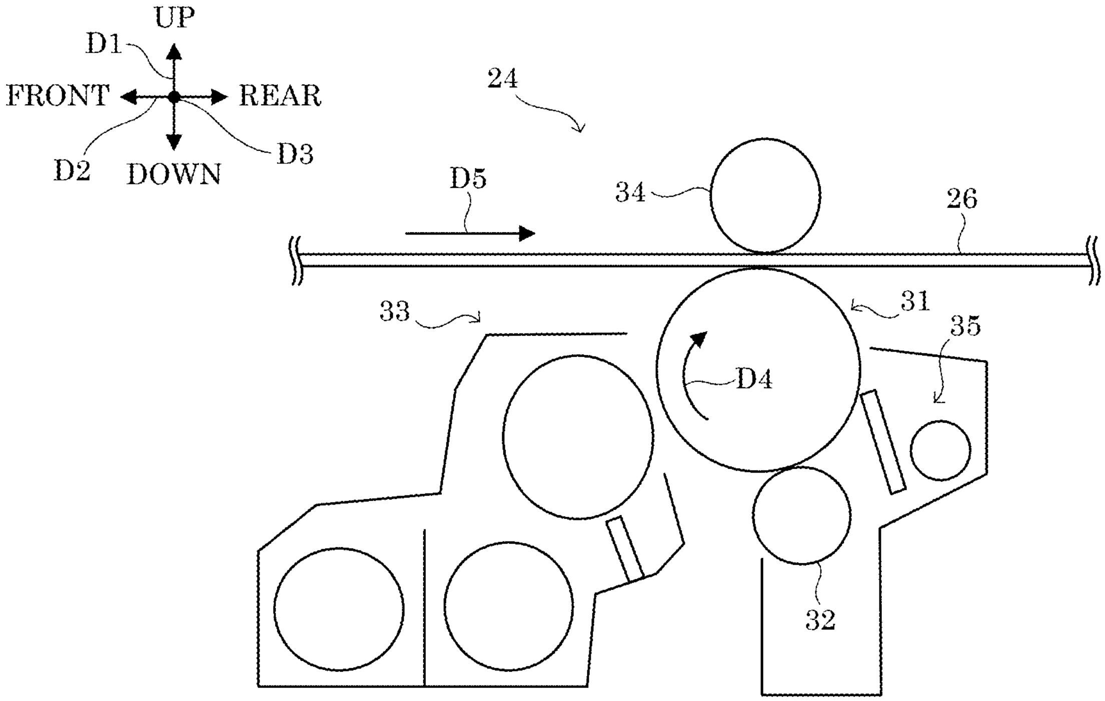
FIG. 3 is a cross-sectional view of a configuration of an image forming unit of the image forming apparatus according to the embodiment of this disclosure.

As shown in FIG. 3, the image forming unit 24 includes a photoconductor drum 31, a charging roller 32, a developing device 33, a primary transfer roller 34, and a drum cleaning portion 35. In addition, each of the image forming units 21 to 23 includes components similar to those of the image forming unit 24. In addition, each of the image forming units 21 to 24 includes a toner container 36 shown in FIG. 1.

An electrostatic latent image is formed on the photoconductor drum 31. The photoconductor drum 31 receives rotational driving force supplied from a motor that is not shown and rotates in a drum rotation direction D4 shown in FIG. 3. This causes the photoconductor drum 31 to convey the electrostatic latent image formed on a surface of the photoconductor drum 31.

The charging roller 32 receives application of a charged voltage set in advance and charges the surface of the photoconductor drum 31. The surface of the photoconductor drum 31 charged by the charging roller 32 is irradiated with light based on image data emitted from the laser scanning unit 25. This forms the electrostatic latent image on the surface of the photoconductor drum 31.

The developing device 33 develops the electrostatic latent image formed on the surface of the photoconductor drum 31. The developing device 33 includes a pair of stirring members and a developing roller. The pair of stirring members stirs a toner and a carrier stored inside the developing device 33. This stirring triboelectrically charges the toner and the carrier. The developing roller draws up the toner stirred by the pair of stirring members and conveys the toner drawn up to an opposed region between the developing roller and the photoconductor drum 31. In addition, the developing roller receives application of a developing bias voltage set in advance and supplies the photoconductor drum 31 with the toner conveyed to the opposed region. This selectively supplies the toner to an exposure region in the photoconductor drum 31 irradiated with the light emitted from the laser scanning unit 25 and develops the electrostatic latent image formed on the surface of the photoconductor drum 31. It is to be noted that the developing device 33 is supplied with the toner from the toner container 36.

The primary transfer roller 34 receives supply of a primary transfer current set in advance and transfers a toner image formed on the surface of the photoconductor drum 31 to the intermediate transfer belt 26.

The drum cleaning portion 35 removes a toner remaining on the surface of the photoconductor drum 31 after the primary transfer roller 34 transfers the toner image.

The laser scanning unit 25 emits the light based on the image data toward the surface of the photoconductor drum 31 of each of the image forming units 21 to 24.

The toner image formed on the surface of the photoconductor drum 31 of each of the image forming units 21 to 24 is transferred to the intermediate transfer belt 26. The intermediate transfer belt 26 is stretched at predetermined tension by a drive roller, a stretching roller, and the four primary transfer rollers 34. The drive roller receives rotational driving force supplied from a motor that is not shown and rotates to cause the intermediate transfer belt 26 to rotate in a belt rotation direction D5 shown in FIGS. 1 and 3. This causes the intermediate transfer belt 26 to convey the transferred toner image.

The secondary transfer roller 27 receives supply of a secondary transfer current set in advance and transfers the toner image transferred to the surface of the intermediate transfer belt 26 to a sheet conveyed by the sheet conveying portion 2. The secondary transfer roller 27 is provided to be opposed to the drive roller with the intermediate transfer belt 26 in between. The secondary transfer roller 27 is biased to the drive roller by a biasing member that is not shown. This forms a transfer nip portion that nips a sheet between the intermediate transfer belt 26 and the secondary transfer roller 27. The secondary transfer roller 27 is provided between a sheet feed path 45 and a sheet discharge path 46. The secondary transfer roller 27 is pressed against a sheet passing through the transfer nip portion and conveys the sheet in a second conveyance direction D7 (see FIG. 1). As shown in FIG. 1, the secondary transfer roller 27 is provided below the fixing device 28. The secondary transfer roller 27 is an example of a transfer portion according to this disclosure.

The fixing device 28 fixes the toner image transferred to the sheet by the secondary transfer roller 27 on the sheet. As shown in FIG. 1, the fixing device 28 includes a fixing member 28A and a pressure member 28B. The fixing member 28A is a roller-shaped or belt-shaped member that heats the toner image transferred to the sheet. Temperature of the fixing member 28A is kept at predetermined target temperature by a heater that is not shown. The pressure member 28B is a roller-shaped member that pressures the sheet. The pressure member 28B is biased to the fixing member 28A by a biasing member that is not shown. This forms a fixing nip portion that nips a sheet between the fixing member 28A and the pressure member 28B. The pressure member 28B is provided in the sheet discharge path 46. The pressure member 28B is pressed against a sheet passing through the fixing nip portion and conveys the sheet in the second conveyance direction D7 (see FIG. 1). The fixing device 28 is an example of a fixing portion according to this disclosure.

The sheet on which the fixing device 28 fixes the toner image is discharged to the sheet discharge tray 29.

Figure 4:
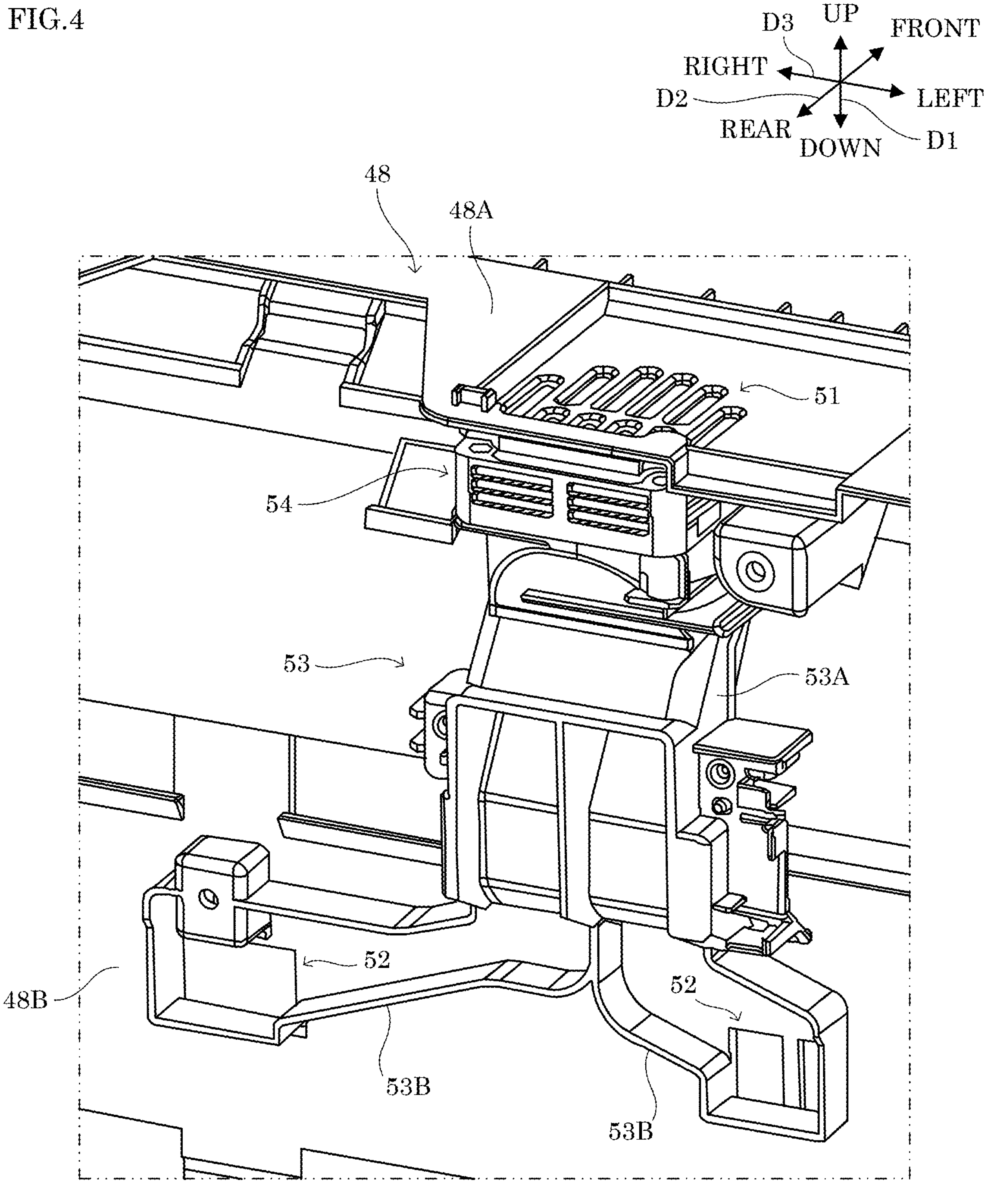
FIG. 4 is a perspective view of a configuration of a duct of the image forming apparatus according to the embodiment of this disclosure.

[Configuration of Sheet Conveying Portion 2] Next, a configuration of the sheet conveying portion 2 will be described with reference to FIGS. 1, 2, and 4. Here, FIG. 4 is a perspective view of a configuration of a duct 53.

As shown in FIG. 1, the sheet conveying portion 2 includes a sheet feed cassette 41, a pickup roller 42, a sheet feed roller 43, a separation roller 44, the sheet feed path 45, the sheet discharge path 46, an inverting conveyance path 47, the guide member 48, and a sensor 49.

The sheet feed cassette 41 stores a sheet on which the image forming portion 1 forms an image. For example, sheets such as paper, coated paper, postcard paper, envelopes, and OHP sheets are stored in the sheet feed cassette 41. The sheet feed cassette 41 is provided with a lift plate 41A (see FIG. 1) on a bottom. The lift plate 41A lifts a bundle of sheets stored in the sheet feed cassette 41 to a position of contact with the pickup roller 42.

The pickup roller 42 is provided upper side of the sheet feed cassette 41. The pickup roller 42 comes into contact with an uppermost sheet of the bundle of sheets lifted by the lift plate 41A and conveys the sheet to the sheet feed roller 43.

The sheet feed roller 43 is provided in the sheet feed path 45. The sheet feed roller 43 comes into contact with an upper surface of the sheet conveyed by the pickup roller 42 and conveys the sheet in a first conveyance direction D6 (see FIG. 1).

The separation roller 44 is provided below the sheet feed roller 43. The separation roller 44 is biased to the sheet feed roller 43 by a biasing member that is not shown. This forms a sheet feed nip portion that nips a sheet between the sheet feed roller 43 and the separation roller 44. When a plurality of sheets is conveyed to the nip portion, the separation roller 44 separates, from a sheet of the plurality of sheets in contact with the sheet feed roller 43, other sheets.

The sheet feed path 45 is a sheet movement path from the sheet feed cassette 41 to the transfer nip portion where the secondary transfer roller 27 transfers the toner image. In the sheet feed path 45, a sheet is conveyed in the first conveyance direction D6 shown in FIG. 1.

The sheet discharge path 46 is a sheet movement path from the transfer nip portion to the sheet discharge tray 29 through the fixing nip portion. In the sheet discharge path 46, a sheet is conveyed in the second conveyance direction D7 shown in FIG. 1. A downstream end of the sheet discharge path 46 in the second conveyance direction D7 is provided with a sheet discharge port 46A (see FIG. 1). The sheet discharge port 46A is open in a first direction D9 (see FIG. 1) orthogonal to the up-down direction D1 above the fixing device 28. For example, the first direction D9 is a direction from a back to the front of the image forming apparatus 100 (see FIG. 1). The sheet on which the fixing device 28 fixes the toner image is discharged from the sheet discharge port 46A. Specifically, the sheet discharge port 46A is provided with a sheet discharge roller 46B (see FIG. 1). The sheet discharge roller 46B discharges a sheet to the sheet discharge tray 29.

The inverting conveyance path 47 is used to invert a sheet passing through the secondary transfer roller 27 and the fixing device 28 and convey the sheet again to the secondary transfer roller 27 and the fixing device 28. The inverting conveyance path 47 branches off from the sheet discharge path 46 at a branch position P1 (see FIG. 1) in the sheet discharge path 46 on a downstream side of the fixing device 28 in the second conveyance direction D7. In addition, the inverting conveyance path 47 merges with the sheet feed path 45 at a merge position P2 (see FIG. 1) in the sheet feed path 45 on an upstream side of the secondary transfer roller 27 in the first conveyance direction D6. Furthermore, the inverting conveyance path 47 has an extending section that extends along the up-down direction D1 on a second direction D10 (see FIG. 1) side opposite to the first direction D9 than the fixing device 28. In the inverting conveyance path 47, a sheet is conveyed in the third conveyance direction D8 shown in FIG. 1.

As shown in FIG. 1, a movable guide member 46C is provided at the branch position P1 in the sheet discharge path 46. The movable guide member 46C is provided to allow for an attitude change between a first attitude (see FIG. 1) for guiding a sheet conveyed in the second conveyance direction D7 to the sheet discharge port 46A and a second attitude for guiding a sheet conveyed by the sheet discharge roller 46B in a direction opposite to the second conveyance direction D7 to the inverting conveyance path 47.

When images are formed on both sides of a sheet, the sheet discharge roller 46B and the movable guide member 46C are used in the image forming apparatus 100 to send a sheet having an image formed on one of the sides to the inverting conveyance path 47. Specifically, the control portion 5 rotates the sheet discharge roller 46B reversely after a back end of a sheet conveyed in the second conveyance direction D7 passes through the branch position P1, but before the sheet is discharged to the sheet discharge tray 29. This conveys the sheet in the direction opposite to the second conveyance direction D7. In addition, the control portion 5 makes an attitude change to bring the movable guide member 46C from the first attitude to the second attitude. This guides the sheet conveyed in the direction opposite to the second conveyance direction D7 to the inverting conveyance path 47.

The guide member 48 forms a guide surface in the second direction D10 (see FIG. 1) opposite to the first direction D9 among a pair of guide surfaces of the extending section of the inverting conveyance path 47 that guides a sheet. As shown in FIGS. 1 and 4, the guide member 48 includes an upper surface forming portion 48A and a guide surface forming portion 48B. The upper surface forming portion 48A is formed to have a shape of a flat plate having thickness in the up-down direction D1 and forms an upper surface of the image forming apparatus 100. The guide surface forming portion 48B is formed to have a shape of a flat plate having thickness in the front-rear direction D2 and forms the guide surface of the extending section of the inverting conveyance path 47 in the second direction D10. The guide surface forming portion 48B extends down from a front end of the upper surface forming portion 48A.

The sensor 49 senses a sheet on a downstream side of the secondary transfer roller 27 in the second conveyance direction D7 and an upstream side of the fixing device 28 in the second conveyance direction D7.

Specifically, the sensor 49 senses deflection of a sheet conveyed by the secondary transfer roller 27.

For example, the sensor 49 is a transmissive light sensor including a light emitting portion and a light receiving portion. In addition, the sheet conveying portion 2 includes an actuator (not shown) that is movable between an opening position at which an optical path between the light emitting portion and the light receiving portion is opened and a blocking position at which the optical path is blocked. The actuator is provided to be movable, when an amount of deflection of the sheet conveyed by the secondary transfer roller 27 exceeds a predetermined value, from the opening position to the blocking position in contact with the deflection. That is, an output signal of the sensor 49 is switched in accordance with whether or not the amount of deflection of the sheet conveyed by the secondary transfer roller 27 exceeds the predetermined value. It is to be noted that the sensor 49 may be a distance sensor capable of measuring distance to the sheet.

In the image forming apparatus 100, speed of the pressure member 28B to convey the sheet is controlled on the basis of a result of sensing of the deflection of the sheet by the sensor 49.

As shown in FIG. 1, the sensor 49 is provided on the second direction D10 (see FIG. 1) side opposite to the first direction D9 than the sheet discharge path 46. The sheet discharge path 46 extends through the fixing device 28. In addition, as shown in FIG. 1, the sensor 49 is provided on the first direction D9 side than the extending section of the inverting conveyance path 47. The extending section of the inverting conveyance path 47 extends along the up-down direction D1 on the second direction D10 side than the sensor 49. The sheet discharge path 46 is an example of a conveyance path according to this disclosure.

For example, the sheet conveying portion 2 includes the two sensors 49 arranged along a width direction (the same direction as the left-right direction D3) of a sheet orthogonal to the second conveyance direction D7. It is to be noted that the sheet conveying portion 2 may include the one sensor 49 or the three or more sensors 49.

It is to be noted that each of the sensors 49 may have a function of simply sensing presence or absence of a sheet alone instead of a function of sensing the deflection of the sheet conveyed by the secondary transfer roller 27.

Incidentally, in the image forming apparatus 100, heat generated in the fixing device 28 sometimes causes the sensor 49 to malfunction. To address this, the image forming apparatus that blows air to the sensor 49 to cool the sensor 49 has been known as the related art.

The image forming apparatus according to the related art, however, has an opening formed on a side surface of the image forming apparatus. The opening is used to take in air that is blown to the sensor 49. Thus, when a stuff or a wall is disposed at a position opposed to the opening, the stuff or the wall interferes with intake of air from the opening to cause the sensor 49 to be insufficiently cooled and this may cause the sensor 49 to malfunction.

In contrast, in the image forming apparatus 100 according to the embodiment of this disclosure, it is possible to suppress malfunction of the sensor 49 caused by the heat generated in the fixing device 28 as described below.

Specifically, the sheet conveying portion 2 includes an air intake port 51, an air blowing port 52, the duct 53, and an air blowing fan 54 shown in FIGS. 1 and 4.

The air intake port 51 is open on the upper surface of the image forming apparatus 100.

As shown in FIGS. 1 and 4, the air intake port 51 is provided on the upper surface forming portion 48A of the guide member 48.

The air blowing port 52 is open toward the sensor 49.

As shown in FIGS. 1 and 4, the air blowing port 52 is provided on the guide surface forming portion 48B of the guide member 48. That is, the air blowing port 52 is formed on the guide surface of the extending section of the inverting conveyance path 47 in the second direction D10.

The air blowing port 52 is provided for each of the sensors 49. That is, the sheet conveying portion 2 includes the two air blowing ports 52 corresponding to the two sensors 49 (see FIG. 4).

The duct 53 extends from the air intake port 51 to the air blowing ports 52.

As shown in FIG. 4, the duct 53 includes a first guide portion 53A and a plurality of second guide portions 53B. The first guide portion 53A is formed to have a shape that extends in a down direction from the air intake port 51. The plurality of second guide portions 53B is formed to have a shape that branches off from the first guide portion 53A and extends to the air blowing ports 52. The air blowing ports 52 are provided for the respective sensors 49. The plurality of second guide portions 53B is provided on a back surface of the guide surface of the guide surface forming portion 48B. It is to be noted that FIG. 4 shows that lid portions which cover back surfaces of the first guide portion 53A and the two second guide portions 53B are removed to expose inside of the first guide portion 53A and the two second guide portions 53B.

The air blowing fan 54 generates the airflow AF (see FIG. 1) that moves in the duct 53 from the air intake port 51 to the air blowing ports 52. The air blowing fan 54 is an example of an airflow generation portion according to this disclosure. It is to be noted that the airflow generation portion according to this disclosure is not limited to a fan. It is sufficient if the airflow generation portion according to this disclosure is any device that is driven to allow the airflow AF to be generated.

As shown in FIGS. 1 and 4, the air blowing fan 54 is provided below the air intake port 51.

The air blowing fan 54 is driven while an image forming process of forming an image on a sheet is being executed. The image forming process includes a both-side image forming process of forming images on both sides of a sheet.

[Configuration of Control Portion 5]

Next, a configuration of the control portion 5 will be described with reference to FIG. 2.

As shown in FIG. 2, the control portion 5 includes a stop processing portion 61 and a reservation processing portion 62.

Specifically, the ROM 12 of the control portion 5 stores a conveyance control program in advance for causing the CPU 11 of the control portion 5 to function as each of the processing portions. The CPU 11 of the control portion 5 then functions as each of the processing portions by executing the conveyance control program stored in the ROM 12. It is to be noted that some or all of the processing portions included in the control portion 5 may include an electronic circuit. In addition, the conveyance control program may be a program for causing a plurality of processors to function as the respective processing portions included in the control portion 5.

The stop processing portion 61 stops conveyance of a sheet when a predetermined stop timing arrives while the both-side image forming process of forming images on both sides of the sheet is being executed.

For example, the stop timing includes a timing at which a condition for executing an adjustment process of adjusting an image forming condition by the image forming portion 1 is satisfied. For example, in the adjustment process, the developing bias voltage to be applied to the developing roller of the developing device 33 is adjusted on the basis of a result of sensing of density of a predetermined sensing toner image to be formed on the intermediate transfer belt 26 by a density sensor that is not shown. While the adjustment process is being executed, conveyance of a sheet is stopped. For example, the condition for executing the adjustment process is that the number of images formed after a start of the both-side image forming process reaches a multiple of a predetermined reference number of images.

In addition, the stop timing includes a timing at which a condition for executing a replenishment process of replenishing the developing device 33 with a toner with an image forming operation stopped is satisfied. Specifically, in the replenishment process, the developing device 33 is replenished with a toner from the toner container 36 with the conveyance of a sheet stopped. For example, the condition for executing the replenishment process is that toner density of inside of the developing device 33 falls below predetermined reference density. The toner density is sensed by a toner density sensor that is not shown.

It is to be noted that the stop timing may include a timing different from the timings described above.

The reservation processing portion 62 reserves, when the stop timing arrives and a sheet is passing through an opposed portion between the sensor 49 and the air blowing port 52, a stop of the conveyance of the sheet by the stop processing portion 61 until passage of the sheet through the opposed portion ends.

For example, the sheet conveying portion 2 includes a sheet sensor (not shown) capable of sensing the presence or absence of a sheet on an upstream side of the opposed portion in the inverting conveyance path 47 in a third conveyance direction D8. When the stop timing arrives, the reservation processing portion 62 determines on the basis of time elapsed since a last timing of sensing a sheet by the sheet sensor whether or not the sheet is passing through the opposed portion. In addition, when it is determined that the sheet is passing through the opposed portion, the reservation processing portion 62 determines on the basis of the time elapsed since the last timing of sensing the sheet by the sheet sensor whether or not the passage of the sheet through the opposed portion ends.

[Conveyance Control Process]

Figure 5:
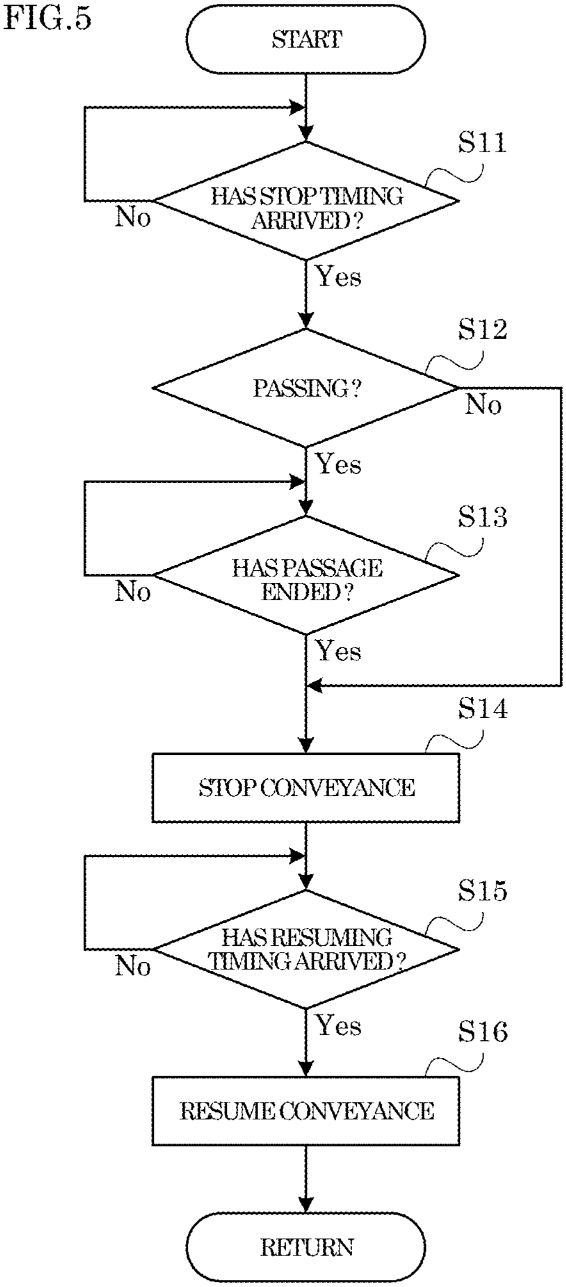
FIG. 5 is a flowchart showing an example of a conveyance control process that is executed by the image forming apparatus according to the embodiment of this disclosure.

The following describes a conveyance control method according to this disclosure along with an example of a procedure for a conveyance control process that is executed by the control portion 5 in the image forming apparatus 100 with reference to FIG. 5. Here, steps S11, S12, . . . denote the numbers of processing procedures (steps) that are executed by the control portion 5. It is to be noted that, when an instruction to execute the both-side image forming process is inputted, the conveyance control process is started along with the both-side image forming process and is ended along with the both-side image forming process.

<Step S11>

First, in step S11, the control portion 5 determines whether or not the stop timing arrives.

Here, when the control portion 5 determines that the stop timing arrives (Yes side in S11), the control portion 5 causes the process to transition to step S12. In contrast, when the control portion 5 determines that the stop timing does not arrive (No side in S11), the control portion 5 waits in step S11 for the stop timing to arrive.

<Step S12>

In step S12, the control portion 5 determines whether or not a sheet is passing through the opposed portion between the sensor 49 and the air blowing port 52.

Here, when the control portion 5 determines that the sheet is passing through the opposed portion (Yes side in S12), the control portion 5 causes the process to transition to step S13. In contrast, when the control portion 5 determines that the sheet is not passing through the opposed portion (No side in S12), the control portion 5 causes the process to transition to step S14.

<Step S13>

In step S13, the control portion 5 determines whether or not the passage of the sheet through the opposed portion between the sensor 49 and the air blowing port 52 ends.

Here, when the control portion 5 determines that the passage of the sheet through the opposed portion ends (Yes side in S13), the control portion 5 causes the process to transition to step S14. In contrast, when the control portion 5 determines that the passage of the sheet through the opposed portion does not end (No side in S13), the control portion 5 waits in step S13 for the passage of the sheet through the opposed portion to end. Here, the process in step S13 is an example of a reservation step according to this disclosure and is executed by the reservation processing portion 62 of the control portion 5.

This reserves, when the sheet is passing through the opposed portion, the process in step S14, that is, a stop of the conveyance of the sheet until the passage of the sheet through the opposed portion ends. It is thus possible to prevent the sheet whose conveyance is stopped from interfering with air blown from the air blowing port 52 to the sensor 49.

<Step S14>

In step S14, the control portion 5 stops the conveyance of the sheet. Here, the process in step S14 is an example of a stop step according to this disclosure and is executed by the stop processing portion 61 of the control portion 5.

<Step S15>

In step S15, the control portion 5 determines whether or not a predetermined resuming timing arrives.

For example, the resuming timing when the adjustment process is executed is an end of the adjustment process. In addition, the resuming timing when the replenishment process is executed is an end of the replenishment process.

Here, when the control portion 5 determines that the resuming timing arrives (Yes side in S15), the control portion 5 causes the process to transition to step S16. In contrast, when the control portion 5 determines that the resuming timing does not arrive (No side in S15), the control portion 5 waits in step S15 for the resuming timing to arrive.

<Step S16>

In step S16, the control portion 5 resumes the conveyance of the sheet.

In this way, the image forming apparatus 100 has the air intake port 51 formed on the upper surface of the image forming apparatus 100. Through the air intake port 51, air that is blown to the sensor 49 is taken in. This makes it possible to prevent a stuff or a wall disposed at a position opposed to the side surface of the image forming apparatus 100 from interfering with the intake of air from the air intake port 51 as compared with the configuration in which the air intake port 51 is formed on the side surface. It is thus possible to suppress the malfunction of the sensor 49 caused by the heat generated in the fixing device 28.

In addition, in the image forming apparatus 100, the sheet discharge port 46A is open in the first direction D9 above the fixing device 28, the secondary transfer roller 27 is disposed below the fixing device 28, and the sensor 49 is provided on the side of the sheet discharge path 46 in the second direction D10 opposite to the first direction D9. This makes it possible to extend the duct 53 in the up-down direction D1 from the upper surface of the image forming apparatus 100 to the sensor 49 on the side of the fixing device 28 in the second direction D10. It is thus possible to simplify a shape of the duct 53.

In addition, in the image forming apparatus 100, the duct 53 includes the first guide portion 53A extending in the down direction from the air intake port 51 and the plurality of second guide portions 53B branching off from the first guide portion 53A and extending to the air blowing ports 52 provided for the respective sensors 49. This makes it possible to cool the plurality of sensors 49 with the one duct 53.

It is to be noted that this disclosure may be applied to an image forming apparatus in which the secondary transfer roller 27 and the fixing device 28 are disposed side by side along a horizontal direction. In addition, this disclosure may be applied to a monochrome image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a transfer portion configured to transfer a toner image to a sheet;

a fixing portion configured to fix the toner image on the sheet, the toner image being transferred to the sheet by the transfer portion;

a plurality of sensors configured to sense the sheet on a downstream side of the transfer portion in a conveyance direction of the sheet and an upstream side of the fixing portion in the conveyance direction;

a duct that extends from an air intake port to an air blowing port, the air intake port being open upward on an upper surface of the image forming apparatus, the air blowing port being open toward the plurality of sensors; and an airflow generation portion configured to generate airflow that moves in the duct from the air intake port to the air blowing port;

a sheet discharge port configured to discharge the sheet on which the fixing portion fixes the toner image, the sheet discharge port being open in a first direction above the fixing portion, the first direction being orthogonal to an up-down direction, wherein the transfer portion is provided below the fixing portion, the plurality of sensors are provided on a second direction side than a conveyance path of the sheet, the conveyance path extending through the fixing portion, the second direction being opposite to the first direction, the plurality of the sensors are arranged along a width direction of the sheet, the width direction being orthogonal to the conveyance direction, and the duct includes a first guide portion and a plurality of second guide portions, the first guide portion extending in a down direction from the air intake port, the plurality of second guide portions branching off from the first guide portion and extending to the air blowing ports, the air blowing ports being provided for the respective sensors.

2. The image forming apparatus according to claim 1, wherein the plurality of sensors sense deflection of the sheet.

3. An image forming apparatus comprising:

a transfer portion configured to transfer a toner image to a sheet;

a fixing portion configured to fix the toner image on the sheet, the toner image being transferred to the sheet by the transfer portion;

a sensor configured to sense the sheet on a downstream side of the transfer portion in a conveyance direction of the sheet and an upstream side of the fixing portion in the conveyance direction;

a duct that extends from an air intake port to an air blowing port, the air intake port being open upward on an upper surface of the image forming apparatus, the air blowing port being open toward the sensor;

an airflow generation portion configured to generate airflow that moves in the duct from the air intake port to the air blowing port;

a sheet discharge port configured to discharge the sheet on which the fixing portion fixes the toner image, the sheet discharge port being open in a first direction above the fixing portion, the first direction being orthogonal to an up-down direction, wherein the transfer portion is provided below the fixing portion, and the sensor is provided on a second direction side than a conveyance path of the sheet, the conveyance path extending through the fixing portion, the second direction being opposite to the first direction; and an inverting conveyance path that extends along the up-down direction on the second direction side than the sensor, wherein the air blowing port is formed on a guide surface of the inverting conveyance path in the second direction a stop processing portion configured to stop conveyance of the sheet when a predetermined stop timing arrives while a both-side image forming process of forming images on both sides of the sheet is being executed; and a reservation processing portion configured to reserve, when the stop timing arrives and the sheet is passing through an opposed portion between the sensor and the air blowing port, a stop of the conveyance of the sheet by the stop processing portion until passage of the sheet through the opposed portion ends.

4. A conveyance control method that is executed by an image forming apparatus, the image forming apparatus including:

a transfer portion configured to transfer a toner image to a sheet;

a fixing portion configured to fix the toner image on the sheet, the toner image being transferred to the sheet by the transfer portion;

a sensor configured to sense the sheet on a downstream side of the transfer portion in a conveyance direction of the sheet and an upstream side of the fixing portion in the conveyance direction;

a duct that extends from an air intake port to an air blowing port, the air intake port being open upward on an upper surface of the image forming apparatus, the air blowing port being open toward the sensor;

an airflow generation portion configured to generate airflow that moves in the duct from the air intake port to the air blowing port;

a sheet discharge port configured to discharge the sheet on which the fixing portion fixes the toner image, the sheet discharge port being open in a first direction above the fixing portion, the first direction being orthogonal to an up-down direction, wherein the transfer portion is provided below the fixing portion, and the sensor is provided on a second direction side than a conveyance path of the sheet, the conveyance path extending through the fixing portion, the second direction being opposite to the first direction; and an inverting conveyance path that extends along the up-down direction on the second direction side than the sensor, the air blowing port being formed on a guide surface of the inverting conveyance path in the second direction, the conveyance control method comprising:

a stop step of stopping conveyance of the sheet when a predetermined stop timing arrives while a both-side image forming process of forming images on both sides of the sheet is being executed; and a reservation step of reserving, when the stop timing arrives and the sheet is passing through an opposed portion between the sensor and the air blowing port, a stop of the conveyance of the sheet by the stop step until passage of the sheet through the opposed portion ends.

* * * * *